United States Patent [19]

Adams

[11] Patent Number: 5,150,812
[45] Date of Patent: Sep. 29, 1992

[54] PRESSURIZED AND/OR CRYOGENIC GAS CONTAINERS AND CONDUITS MADE WITH A GAS IMPERMEABLE POLYMER

[75] Inventor: Peter M. Adams, Charlotte, N.C.

[73] Assignee: Hoechst Celanese Corporation, Somerville, N.J.

[21] Appl. No.: 548,034

[22] Filed: Jul. 5, 1990

[51] Int. Cl.⁵ .............................. B65D 25/34
[52] U.S. Cl. ................... 220/414; 220/456; 220/458; 220/461; 220/590; 215/1 C
[58] Field of Search .............. 220/414, 3, 453, 454, 220/456, 457, 458, 461; 215/1 C

[56] References Cited

U.S. PATENT DOCUMENTS

| | | | |
|---|---|---|---|
| 3,535,179 | 10/1970 | Shriver | 156/172 |
| 3,908,851 | 9/1975 | Jacobs | 220/414 |
| 3,929,247 | 12/1975 | Borup | 220/914 |
| 4,312,917 | 1/1982 | Hawley | 428/375 |
| 4,439,387 | 3/1984 | Hawley | 264/108 |
| 4,540,737 | 9/1985 | Wissburn et al. | 524/599 |
| 4,614,279 | 9/1986 | Toth et al. | 220/414 |
| 4,642,252 | 2/1987 | Sasaki et al. | 220/414 |
| 4,785,955 | 11/1988 | Sasaki | 220/414 |
| 4,799,985 | 1/1989 | McMahon et al. | 156/166 |
| 4,867,044 | 9/1989 | Holtrop | 220/414 |

FOREIGN PATENT DOCUMENTS

| | | |
|---|---|---|
| 121883 | 3/1984 | European Pat. Off. . |
| 232605 | 12/1986 | European Pat. Off. . |
| 3739490 | 1/1989 | Fed. Rep. of Germany . |
| 2303230 | 10/1976 | France . |

OTHER PUBLICATIONS

Burgeson, J. E., "Reinforcing Liner for Composite Cryogenic Tank", NASA Tech Briefs, Jun. 1990. p. 66.
"Composite Cylinders for GNG", 34th Annual Conf., Reinforced Plastics/Composites Inst., Soc.-Plas. Ind., Feb. 1981.
Morris, E. E., "Advances in Fiber/Metal Pressure Vessel Technology", AIAA 1989, pp. 1-9.
Morris, V. L., "Advanced Composite Structures for Cryogenic Applications", 34th Int'l. SAMPE Syn., May, 1989, pp. 1867-1976.
Chiou, J. S. et al., "Gas Transport in Thermotropic Liquid Crystalline Polyster", J. Poly Sci., Part B Poly. Phys., vol. 25, 1699-1707, 1987.
Lynn, V., "What is Filament Winding?" Aerospace Design and Sep. 1986, pp. 32-37.
Peter, S. T. et al., "Filament Winding", Engineering Materials Handbook, Nov. 1987, pp. 503-510.

Primary Examiner—Joseph Man-Fu Moy
Attorney, Agent, or Firm—Robert H. Hammer, III

[57] ABSTRACT

A container or conduit for compressed gas and/or cryogenic gas is constructed with a gas impermeable synthetic polymer forming a gas barrier and a structural component that provides structural integrity to the container or conduit. The structural component is associated with the barrier. The gas impermeable synthetic polymer is preferably a thermotropic liquid crystal polymer.

13 Claims, 2 Drawing Sheets

PRESSURIZED AND/OR CRYOGENIC GAS CONTAINERS AND CONDUITS MADE WITH A GAS IMPERMEABLE POLYMER

FIELD OF THE INVENTION

Containers (e.g. tanks, vessels, cylinders, bottles, leak-tight tubes, dewars and the like) and/or conduits (e.g. piping, tubing or the like) for pressurized or compressed gases and/or cryogenic gases are made entirely of polymeric materials.

BACKGROUND OF THE INVENTION

Containers for the storage and/or the transportation of pressurized or compressed gases and cryogenic gases have traditionally been made of metal. Metal was the material of choice because of its strength and its gas barrier properties. Some such tanks, known as "bottles", are currently used for the transportation and the storage of gases such as those used in hospitals or by welders. These bottles usually weigh about 150 pounds empty and only contain about 10 pounds of gas when filled. Accordingly, the transportation costs of gases in such bottles are high. Moreover, handling of these bottles frequently results in back strain and broken feet.

Metal lined-fiber wrapped containers were subsequently developed in conjunction with the space exploration program. These containers reduced the amount of metal required to contain the compressed or cryogenic gas. These containers utilize a gas impermeable metal, inner liner and a structural overwrap which is made of a composite material (i.e., fibers cured within a matrix resin). These containers are typically manufactured in cylindrical or spherical forms. Further information about metal lined-fiber wrapped containers may be found in the following publications, which are incorporated herein by reference: "Composite Cylinders for CNG", 36th Annual Conference, Reinforced Plastics/Composites Institute, The Society of the Plastics Industry, Inc., Feb. 16-20, 1981, Session 22-E, P. 1-8; Morris, E.E., "Advances in Composite Fiber/Metal Pressure Vessel Technology", American Institute of Aeronautics and Astronautics, Inc., 1989, p. 1-9; Morris, V.L., "Advanced Composite Structures For Cryogenic Applications", 34th International SAMPE Symposium, May 8-11, 1989, p. 1867-1876.

These containers find their application in specialized areas where the need to minimize container weight overshadows container cost. Such applications include: breathing systems for rescue backpacks, underwater diving, and mountain climbing; inflation systems for aircraft and life rafts; storage and transportation of pressurized and/or cryogenic gases for spacecraft, aircraft, and military applications.

Within the genus of metal lined-fiber wrapped containers, two species exist: a filament reinforced metal pressure vessel, and a metal-lined filament wound pressure vessel. These distinct vessels can be distinguished on a weight basis. In the former, weight bows to cost. The former has a load bearing metal liner. This means a thick metal, inner liner and a filament overwrap that reinforces the strength of the liner. In the latter, cost bows to weight. This means a thin metal liner which is sufficiently thick to provide adequate gas impermeability and a filament overwrap that provides the strength to withstand the internal gas pressure of the container.

The metals used for the above-mentioned liners are alloys of aluminum, stainless steel, and titanium or alloys such as Inconel or Monel. The continuous filaments (or structural fibers) used in the overwrap are fiberglass, aramid fibers, alumina fibers, boron fibers, and carbon fibers. The matrix resins used to cure or to consolidate the filaments of the overwrap are thermosetting and thermoplastic resins. Thermosetting resins, however, are the most popular and include epoxy, polyester, phenolic, bismaleimide, and polyimide resins.

The metal liner may be formed into the desired shape using conventional techniques. The structural overwrapping is wound over the metal liner, which acts as a mandrel, by a filament winding process. Filament winding, a well known process, consists of wrapping continuous fibers around a mold or a mandrel surface in precise geometric patterns, e.g. polar, helical, or hoop windings and curing or consolidating the wound fibers into a composite material. By properly orienting and proportioning one or more winding patterns, an efficient structure results in which filaments can be more uniformly loaded than with other methods of composite manufacture such as hand lay-up, tape laying or braiding.

In yet another lightweight container, thin metal foils or films are laminated onto films or fiber mats of polymers or glass and are used as the inner liner of the container. See U.S. Pat. Nos. 3,535,179 and 3,929,247 and French Patent No. 2,303,230. The metal foil acts as the gas impermeable barrier.

SUMMARY OF THE INVENTION

A container or conduit for compressed gas and/or cryogenic gas comprises a gas impermeable synthetic polymer forming a gas barrier; and means for providing structural integrity to the container or conduit, said structural means being associated with said barrier.

DESCRIPTION OF THE DRAWINGS

For the purpose of illustrating the invention, there is shown in the drawings several forms which are presently preferred, it being understood, however, that this invention is not limited to the precise arrangement and instrumentality shown.

DETAILED DESCRIPTION OF THE INVENTION

Figure 1:
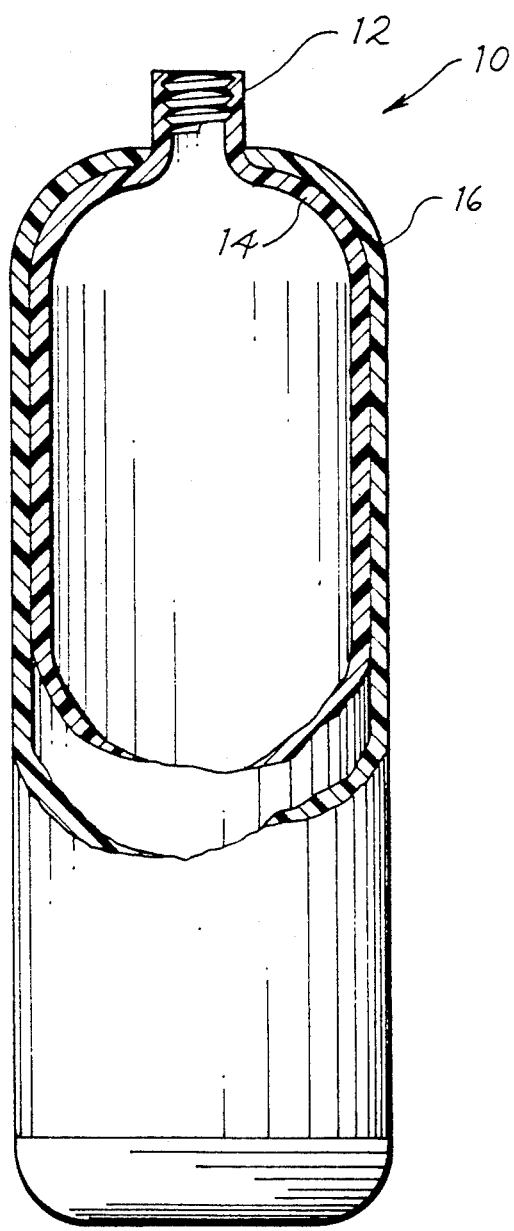
FIG. 1 is an elevational view of one embodiment of the invention, parts broken away for clarity.

A gas impermeable synthetic polymer forms the gas barrier of a container or conduit. (Hereinafter, except where specifically referenced, container shall also refer to conduit.) The gas barrier made of the gas impermeable synthetic polymer eliminates the need for the metal liner discussed above. Thus, the weight of the container is decreased. This gas barrier requires no metal foil or metal film or metal shell to supplement its gas barrier function. The gas barrier properties of polymer act alone as the barrier.

In most containers, however, the gas barrier alone may not give sufficient structural integrity to the container. Accordingly, the barrier may be supplemented with a mean for providing the structural integrity. Such means shall be discussed in greater detail below.

Hereinafter, several key terms shall be explained.

The term "pressurized gas" or "compressed gas", as used herein, means: any material or mixture that, when enclosed in a container, has an absolute pressure exceeding 40 psi at 21.1° C. or, regardless of the pressure at 21.1° C. has an absolute pressure exceeding 140 psi at 54.4° C.; or any flammable material having a vapor pressure exceeding 40 psi absolute at 37.7° C. (vapor pressure determined by Reid method (ASTM)). Compressed gases include, but are not limited to, liquified petroleum gases (q.v.), as well as, oxygen, nitrogen, anhydrous ammonia, acetylene, nitrous oxide, and flourocarbon.

The term "cryogenic gas", as used herein, means: a liquid form of a material that when at standard temperature and pressure (STP), it would be a gas. For example, liquified hydrogen (B.P. −252.87° C. at 1 atm); liquified helium (B.P. −298.9° C. at 1 atm); liquified oxygen (B.P. −182.97° C. at 1 atm). Other non-limiting examples of such liquified gases may be found in *CRC's Handbook of Chemistry and Physics*, 56th Ed., p. B-420, which is incorporated herein by reference.

The term "gas impermeable synthetic polymer", as used herein, means: a man-made organic polymer that has gas barrier properties. Additionally, but not necessarily, such polymers may also exhibit a high strength and modulus over a broad temperature range, exhibit no embrittlement at cryogenic temperatures, and have a low coefficient of thermal expansion. The "gas barrier properties" of these polymers are such that low molecular weight gases, such as hydrogen and helium, may be stored at high pressures, above several thousand pounds per square inch, with virtually no leakage and virtually no solubility of the gas in the polymer. The gas transporting properties of certain thermotropic liquid crystal polymers and polyacrylonitrile are discussed in Chiou, J.S. et al. "Gas Transport in a Thermotropic Liquid-Crystalline Polyester", *Journal of Polymer Science: Part B: Polymer Physics*, Vol. 25, 1699–1707 (1987), which is incorporated herein by reference. Such gas impermeable synthetic polymers may include liquid crystal polymers or liquid crystalline polymers (hereinafter "LCP's"), polyacrylonitrile (PAN), polyether ketone (PEK), polyether ether ketone (PEEK), polyether ether ketone ketone (PEEKK), high density polyethylene (HDPE), ultra high molecular weight polyethylene (UHMWPE) and polyester, for example, Mylar, a polyester film. PAN is less preferred because it is not readily heat fusable. Thermotropic LCP's, however, have the greatest applicability in the instant invention.

Thermotropic LCP's exist in a liquid-crystalline melt state above their melting point and are anisotropic in the melt phase. Thermotropic LCP's are melt processable. These polymers have been described by various terms, including "liquid crystalline", "liquid crystal", "mesophase", and "anisotropic melt-forming". This quality may be confirmed by conventional polarized light techniques where crossed polarizers are utilized. The polymer is optically anisotropic if, in the melt phase, it transmits light when examined between crossed polarizers. Thermotropic LCP's also have good chemical resistance and noncorrosive properties. Thermotropic LCP's include, but are not limited to, wholly and non-wholly aromatic polyesters, aromatic-aliphatic polyesters, aromatic polyazomethenes, aromatic polyester-carbonates, and wholly aromatic and non-wholly aromatic polyester-amides. The most preferred thermotropic LCP's included wholly and non-wholly aromatic polyseters. A variety of these polymers are described in U.S. Pat. Nos. 4,540,737 and 4,799,985, each of which is incorporated herein by reference. One specific thermotropic LCP is available commercially under the trade names VECTRA , and the fiber form of this polymer is available commercially under the trade name VECTRAN from the Hoechst Celanese Corporation of Charlotte, N.C. Other thermotropic LCP's are available commercially under the trade names: "PET-80PHB", Eastman Kodak Co. (Performance Plastics Eastman Chemical Division) of Rochester, N.Y.; "Xydar", Amoco Performance Products, Inc. of Ridgefield, Conn.; "Victrex", ICI, Inc. Advance Materials of Exton, Pa.; "HK-2000", E.I. DuPont de Nemours and Co., Wilmington, Del.; "Ultrax", BASF AG of Charlotte, N.C. Still other thermotropic LCP's are or will soon be available from General Electric Co. of Pittsfield, Mass. and Bayer AG of Pittsburgh, Pa. or Leverkus, W. Germany.

The term "matrix resin" shall comprise thermosetting or thermoplastic resin materials. The term "resinous matrix" shall comprise gas impermeable synthetic polymers. The definitions for other terms shall be obtained from the text.

Hereinafter, preferred embodiments shall be discussed.

Two container constructions that embody the inventive concept have been envisioned. The first generally comprises a discrete liner made with the gas impermeable synthetic polymer and a discrete structural overwrap surrounding the liner. The second generally comprises a composite wall wherein the gas impermeable polymer is the resinous matrix surrounding structural fibers that provide structural integrity to the container. Each embodiment will be discussed, in greater detail, below.

Referring to the drawings wherein like numerals indicate like elements, there is shown in FIG. 1 a vessel 10 that embodies the first construction mentioned above. Vessel 10 is a container which defines an enclosed volume. In the industry, such containers are also known as tanks, vessels, bottles, cylinders, leak-tight-tubes or dewars. Exemplary dimensions for the container shown in FIG. 1 may range from about 6 inches to about 23 inches in outside diameter by about 1 to about 45 feet in length. It should be understood that those dimensions are not limiting. The containers covered by the instant invention are not limited to those cylindrical in shape, but also may include spherical containers or other shapes as well.

At one end of vessel 10 is a boss 12. Boss 12 serves the function of allowing ingress and egress to the enclosed volume and may be used to affix a valve (not shown) to the vessel. The boss 12 may take at least several forms. The boss may be a discrete member, for example made of metal, which is secured to vessel 10. Alternatively, the boss may be formed as an integral part of the vessel 10. The boss could be a pipe or conduit affixed to the vessel 10.

Vessel 10 preferably comprises at least two layers. Inner liner 14 comprises the gas impermeable synthetic polymer and may range in thickness from 5 to 50 mils (these dimensions are not limiting). A structural overwrap 16 surrounds and may be bonded to or in contact with the inner liner 14. Alternatively, an insulator (not shown) may be interposed between liner 14 and overwrap 16 or the insulator may surround the overwrap. The insulator could also take the form of a vacuum, such as in a dewar. In the dewar construction, not shown, the walls on either side of the vacuum space are formed as disclosed herein.

The inner liner 14 of gas impermeable polymer may be formed from fibers, films or resins containing the polymer. The resins may be formed into the liner by an injection molding process or a blow molding process. The films may be formed into the liner by wrapping the film about a mandrel and then fusing the film to itself, for example. The preferred method for forming the inner liner is by filament winding of the fibers of the polymer or a combination of the polymer (used as a resinous matrix material) and other structural fibers. Filament winding will be discussed in greater detail below.

Structural overwrap 16 is made of a composite material. Composite material is made of structural fibers which are consolidated within a matrix resin. Such structural fibers may be made of graphite, carbon, aramid (e.g., Kelvar), S2 glass, E glass, Boron, LCP's, and ultra-high molecular weight polyethylene. These fibers are consolidated within matrices of thermoplastic or thermosetting matrix resins. Thermosetting matrix resins, however, are most popular and include epoxy, polyester, phenolic, bismaleimide (BMI), and polyimide resins. The composite material of the structural overwrap 16 may be made by any technique for making composites, for example, hand lay-up, tape laying, braiding, or filament winding. Filament winding of continuous fibers, however, is preferred.

Figure 2:
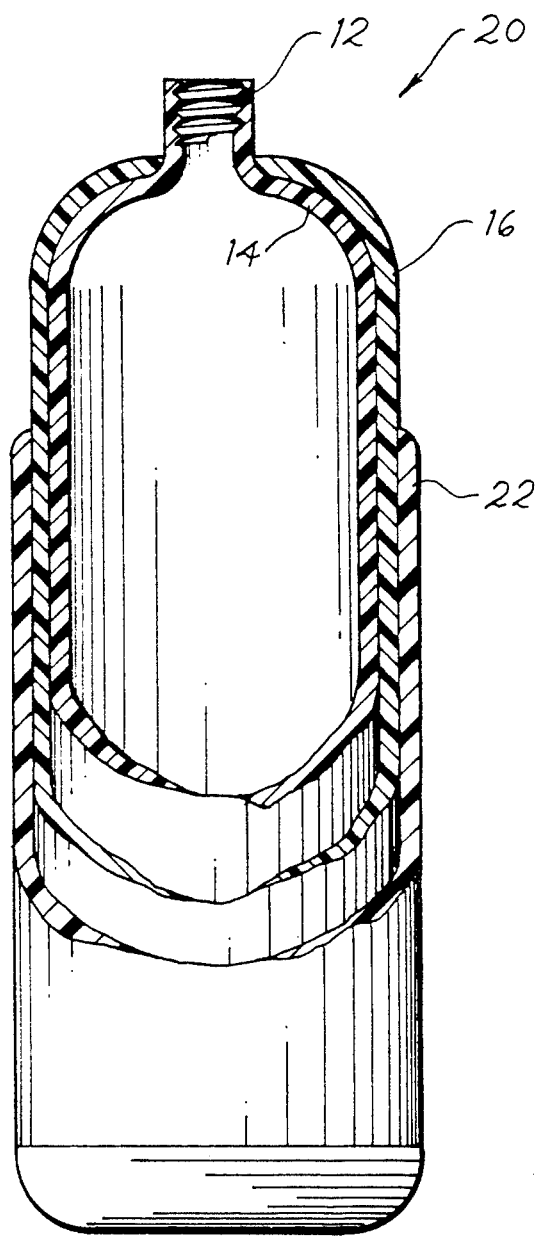
FIG. 2 is an elevational view of another embodiment of the invention, parts broken away for clarity.

Referring to FIG. 2, an alternate embodiment 20 of the first construction (FIG. 1) is shown. Vessel 20 is identical to vessel 10 except that an additional structural overwrap layer 22 has been added. Overwrap layer 22 is formed in the same manner as overwrap 16 and with the same category of material as for overwrap 16. The difference is that overwrap 22 preferably has a hoop winding pattern. Overwrap layer 22 is used to supplement the strength of overwrap 16. Any number of additional overwraps may be used. Moreover, a metal overwrap could be used.

Figure 3:
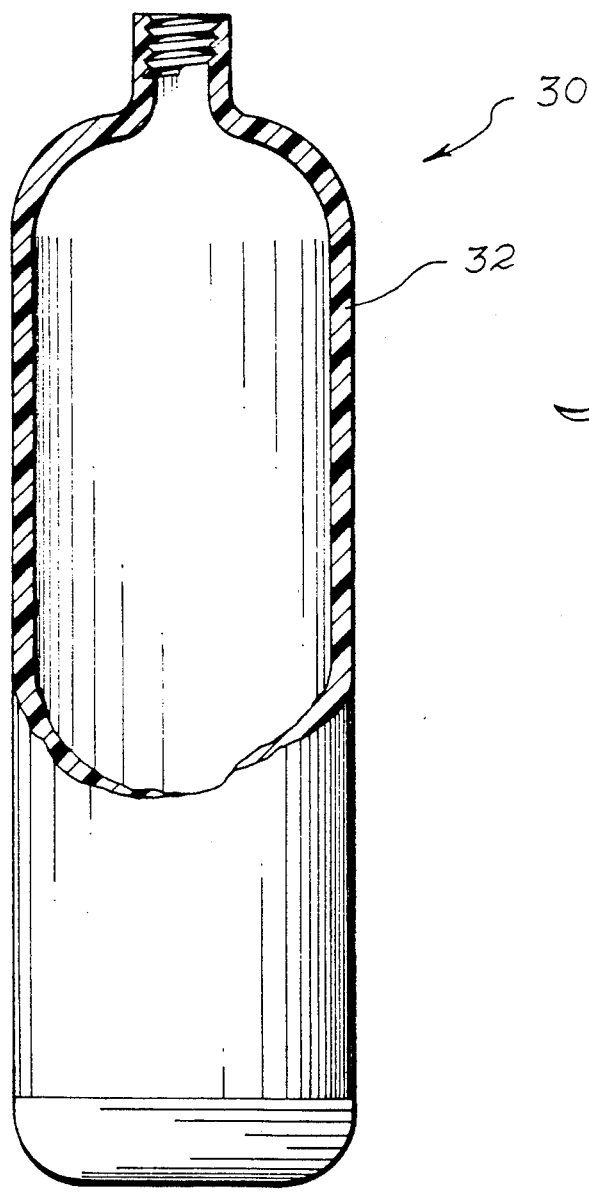
FIG. 3 is a elevational view of yet another embodiment of the invention, parts broken away for clarity.

Referring to FIG. 3, there is shown a vessel 30 that embodies the second construction mentioned above. The container's wall 3 is entirely composite in nature, i.e. structural fibers embedded within a resinous matrix comprising the gas impermeable synthetic polymer. The structural fibers are the same as discussed above with reference to structural overwrap 16. The wall 32 is preferably made by the filament winding process.

Figure 4:
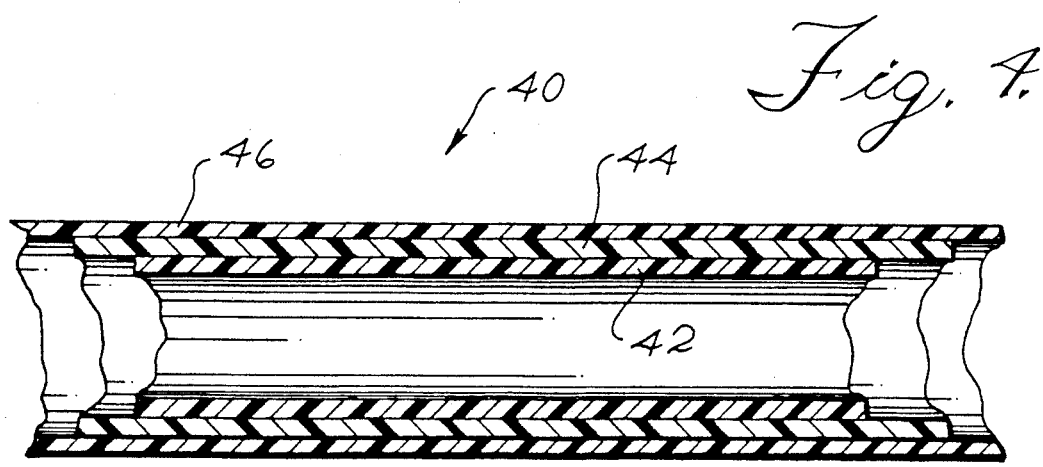
FIG. 4 is an elevational view of conduit, made according to the invention, parts broken away for clarity.

Referring to FIG. 4, another embodiment, conduit 40, of the instant invention is shown. The only difference between conduit 40 and vessels 10 and 20 is that the conduit does not define an enclosed volume, that is the ends of the tube are opened. The conduit 40 preferably includes an inner liner 42 (same a inner liner 14) of a gas impermeable polymer, and either one or two structural overwrap layers 44 and 46 (same as structural overwraps 16 and 32, respectively). Alternatively, conduit 40 could have a construction like that discussed with regard to vessel 30.

As discussed above, filament winding is the preferred process for making the containers disclosed herein. Filament winding allows the fibers to be oriented and proportioned in various winding patterns to maximize the structural properties of the fiber. After the fibers are wound, they may be fused by vacuum bagging and consolidating in an autoclave or directly on the forming mandrel by the application of heat.

As mentioned above, filament winding is a known process, as are the various winding patterns, that include polar, helical, hoop, and combinations thereof. Further information about filament winding and winding patterns may be obtained by reference to: Lynn, V., "What is Filament Winding?", *Aerospace Design and Components,* Sep., 1986, p. 32-37; and Peter, S. T. et al., "Filament Winding", *Engineered Materials Handbook,* Nov. 1987, p. 503-510. Both said articles are incorporated herein by reference.

Typically in filament winding, the structural fibers and the matrix material are simultaneously wound around the mold or mandrel. In addition to conventional molds or mandrels, a perforated metal mandrel could be used. To do this, the structural fibers and matrix material, in fiber form, are commingled into a tow; or the matrix material may be preprepged onto the structural fibers; or the matrix material may be extruded over the structural fiber as disclosed in U.S. Pat. Nos. 4,312,917 and 4,439,307, both are incorporated herein by reference. A preferred matrix material is Vectran ® M available commercially from the Hoechst Celanese Corporation of Charlotte, N.C. Vectran M fiber is a thermotropic LCP having a melting point of about 276° C. and the necessary gas barrier properties.

The utility for the instant invention lies in any application where there is a need to reduce the weight of a compressed gas or cryogenic gas container or conduit. For example, the storage and transportation of compressed and/or cryogenic gases, the fuel container for a vehicle powered by liquified natural gas, in breathing systems to be carried on an individual's back, and inflation systems for aircraft and life rafts.

The present invention may be embodied in other specific forms without departing from the spirit or essential attributes thereof, and accordingly, reference should be made to the appended claims, rather than to the foregoing specification as indicating the scope of the invention.

What is claimed:

1. A container or conduit for compressed gas and/or cryogenic gas comprising:
   gas barrier means for containing the compressed gas and/or cryogenic gas, said gas barrier means comprising a gas impermeable synthetic polymer, said polymer being selected from the group consisting of liquid crystal polymers, polyacrylonitrile, polyether ketone, polyether ether ketone, polyether ether ketone ketone, high density polyethylene, and ultra high molecular weight polyethylene; and
   means for providing structural integrity to the container or conduit, said structural means overwrapping said gas barrier means.

2. A container or conduit for compressed gas and/or cryogenic gas comprising:
   gas barrier means for containing the compressed gas and/or cryogenic gas, said gas barrier means comprising a gas impermeable synthetic polymer, said polymer having a permeability coefficient less than or equal to $1.8 \times 10^{-11}$ cm$^3$(STP)·cm/cm$^2$·sec·cmHg; and
   means for providing structural integrity to the container or conduit, said structural means overlapping said gas barrier means.

3. A container or conduit for compressed gas and/or cryogenic gas comprising:

a wall of the container or conduit includes a resinous matrix with structural fibers embedded within said resinous matrix, said resinous matrix comprising a gas impermeable synthetic polymer, said polymer being a means for containing the compressed gas and/or cryogenic gas and being selected from the group consisting of liquid crystal polymers, polyacrylonitrile, polyether ketone, polyether ether ketone, polyether ether ketone ketone, high density polyethylene, and ultra high molecular weight polyethylene, and said structural fibers being means for providing structural integrity to the container or conduit.

4. A container or conduit for compressed gas and/or cryogenic gas comprising:

a wall of the container or conduit includes a resinous matrix with structural fibers embedded within said resinous matrix, said resinous matrix comprising a gas impermeable synthetic polymer, said polymer being a means for containing the compressed gas and/or cryogenic gas and having a permeability coefficient less than or about $1.8 \times 10^{-11}$ cm$^3$(STP)·cm/cm$^2$·sec·cmHg, and said structural fibers being means for providing structural integrity to the container or conduit.

5. The container or conduit according to claims 1, 2, 3, or 4 wherein said gas barrier means includes no metal that acts as the gas barrier.

6. The container or conduit according to claims 2 or 4 wherein said gas impermeable synthetic polymer is selected from the group consisting of liquid crystal polymers, polyacrylonitrile, polyether ketone, polyether ether ketone, polyether ether ketone ketone, high density poltyethylene, ultra high molecular weight polyethylene, and polyester.

7. The container or conduit according to claims 1 or 2 wherein said structural means comprises a composite material.

8. The container or conduit according to claim 7 wherein said composite material comprises structural fibers embedded within a matrix resin.

9. The container or conduit according to claims 1 or 2 wherein said gas barrier means comprises a discrete lever comprising structural fiber embedded within a resinous matrix comprising said gas impermeable synthetic polymer.

10. The container or conduit according to claims 1, 2, 3 or 4 wherein said gas impermeable synthetic polymer is a liquid crystal polymer.

11. The container or conduit according to claim 10 is a thermotropic liquid crystal polymer.

12. The container or conduit according to claim 11 wherein said thermotropic liquid crystal polymer is selected from the group consisting of wholly and non-wholly aromatic polyesters, aromatic-aliphatic polyesters, aromatic polyazomethenes, aromatic polyester-carbonates, and wholly and non-wholly aromatic polyester amides.

13. The container or conduit according to claim 12 wherein said crystal polymer is selected from the group consisting of wholly and non-wholly aromatic polyesters.

* * * * *